United States Patent Office 3,801,616
Patented Apr. 2, 1974

3,801,616
PROCESS FOR PRODUCING SILOXANE-POLY-
OXYALKYLENE BLOCK COPOLYMERS
Carl J. Litteral, Marietta, Ohio, assignor to Union
Carbide Corporation, New York, N.Y.
No Drawing. Filed Mar. 10, 1972, Ser. No. 233,732
Int. Cl. C07f 7/18
U.S. Cl. 260—448.8 R                10 Claims

ABSTRACT OF THE DISCLOSURE

This application relates to a process for producing siloxane-polyoxyalkylene block copolymers by reacting an alkoxysiloxane and a hydroxyl endblocked polyoxy-alkylene copolymer in the presence of an acid salt catalyst having a pH within a critical range. The block copolymers produced by the process are useful as foam stabilizers in producing polyurethane foams.

---

Siloxane - polyoxyalkylene block copolymers wherein the blocks are linked by silicon to oxygen to carbon linkages are known materials used commercially in producing polyurethane foams. One process for producing such block copolymers involves a transesterification reaction between an alkoxysiloxane and a hyroxy endblocked polyoxyalkylene polymer. The transesterification reaction is conducted in the presence of a catalyst (e.g., trifluoroacetic acid or a mixture of trifluoroacetic acid and potassium acetate) to produce the block copolymer and an alkanol as a byproduct. Although this known process has been used successfully to produce such block copolymers by such a transesterification process in a shorter reaction time in order to increase the amount of block copolymer that can be produced in a given reactor.

It is an object of this invention to produce siloxane-polyoxyalkylene block copolymers of the above-described type.

It is another object of this invention to produce siloxane-polyoxyalkylene block copolymers of the above-described type at a rate faster than the rate of prior transesterification processes.

Other objects of this invention will be apparent from the following description thereof.

This invention provides a process for producing a liquid siloxane-polyoxyalkylene block copolymer which comprises:

(I) forming an at least partially compatible reaction mixture containing:

(a) a siloxane reactant having at least one silicon-bonded alkoxy group, each such alkoxy group containing from 1 to 12 carbon atoms inclusve, and having silicon-bonded monovalent hydrocarbon groups, each such hydrocarbon group containing from 1 to 14 carbon atoms inclusive, (b) a polyoxyalkylene polymer reactant having at least one alcoholic hydroxyl group, and (c) an acid salt catalyst, said catalyst being characterized by the ability to form a solution that consists of 0.0033 gram moles of said catalyst, 37 grams of water and 48 to 50 grams of a polyether having the average formula $C_4H_9(OC_2H_4)_{21}(OC_3H_6)_{16}OH$ and that has an apparent pH from 2.4 to 3.6 inclusive; and (II) maintaining the reaction mixture at a temperature at which (a) and (b) react to form the liquid siloxane-polyoxyalkylene block copolymer and an alkanol byproduct while removing the alkanol byproduct from the reaction mixture.

The siloxane reactants employed in the process of this invention are characterized by the presence of at least one silicon-bonded alkoxy group. Illustrative of such reactants are those represented by the average formula:

$$(R_3SiO_{0.5})_a(R_2SiO)_b(RSiO_{1.5})_c(R'O_{0.5})_d \quad (1)$$

wherein R represents a monovalent hydrocarbon group containing from 1 to 14 carbon atoms inclusive, R' is an alkyl group containing from 1 to 12 carbon atoms inclusive, $a$ and $c$ each have a value of at least 0, $b$ has a value of at least 5 and $d$ has a value of at least 1. $R'O_{0.5}$ taken together with half of an oxygen of $R_2SiO$ or $RSiO_{1.5}$ constitute an alkoxy group. Preferably, $a$ has a value from 0 to 4 inclusive, $b$ has a value from 10 to 75 inclusive, $c$ has a value from 1 to 5 inclusive and $d$ has a value from 2 to 7 inclusive.

Typical of the monovalent hydrocarbon groups represented by R in Formula 1 are the linear alkyl groups (for example, the methyl, ethyl, n-propyl, iso-propyl, n-butyl, sec-butyl, isobutyl, t-butyl, n-octyl, decyl, dodecyl groups), the cycloalkyl groups (for example, the cyclopropyl, cyclobutyl, cyclopentyl, cyclohexyl, cycloheptyl groups), the aryl groups (for example, the phenyl, naphthyl, phenathrenyl, anthracenyl groups), the aralkyl groups (for example, the bensyl, 2-phenylethyl, 2-phenylpropyl, cumyl groups), the alkaryl groups (for example, the tolyl, t-butyphenyl, cyclohexylphenyl groups), the linear alkenyl groups (e.g., the vinyl and allyl groups) and the cyclic alkenyl groups (e.g., the cyclopentenyl and the cyclohexenyl groups). Typical of the groups represented by R' in Formula 1 are the alkyl groups (for example, the methyl, ethyl, n-propyl, iso-propyl, n-butyl, sec-butyl, isobutyl, t-butyl, n-octyl, decyl, dodecyl groups), and the cycloalkyl groups (for example, the cyclopropyl, cyclobutyl, cyclopentyl, cyclohexyl, cycloheptyl groups). Preferably all, or at least substantially all, groups represented by R are methyl groups and preferably the groups represented by R' are methyl or ethyl groups.

The polyoxyalkylene reactants employed in the process of this invention are characterized by the presence of at least one alcoholic hydroxyl group. Illustrative of such reactants are those represented by the average formula:

$$R''(OC_mH_{2m})_nOH \quad (2)$$

wherein R'' represents hydrogen or an R group as above defined, $m$ has a value of at least 2 and $n$ has a value of of at least 5. Preferably, R'' is an alkyl group having from 1 to 4 carbon atoms inclusive, $(OC_mH_{2m})_n$ represents polyoxyethylene or poly(oxyethylene-oxypropylene), and $n$ has a value from 10 to 40 inclusive.

The alkoxysiloxane reactants useful in the process of this invention can be produced by the acid or base catalyzed rearrangement (equilibration) of an alkoxysilicon compound and a hydrocarbonsiloxane. The hydroxyl endblocked polyoxyalkylene reactants useful in the process of this invention and the polyether employed in measuring the pH of the salts useful in the process of this invention can be produced by the base-catalyzed condensation of an alkanol and at least one alkylene oxide. The aforementioned polyether employed in the pH measurements is commercially available as "Ucon 50HB660."

The catalysts that are useful in the process of this invention are acid salts characterized by the ability to form solutions that consist of 0.0033 gram moles of the catalyst, 37 grams of water and 48 to 50 grams of a polyether having the average formula $$C_4H_9(OC_2H_4)_{21}(OC_3H_6)_{16}OH$$

and that have an apparent pH from 2.4 to 3.6 inclusive. The catalysts are made from strong acids such as sulfuric acid, haloalkylsulfonic acids, arylsulfonic acids and alkarylsulfonic acids (e.g., p-toluene sulfonic acid, dodecylbenzene sulfonic acid and trifluoromethane sulfonic acid) and weak bases such as tertiary amines and tertiary phosphines (e.g., pyridine, N,N-diethyl aniline, 1,3,5-trimethyl pyridine, quinoline and trialkyl phosphine), with the proviso that the catalyst has a pH within the range indicated above. The acid salt catalysts are conveniently produced by standard methods (e.g., by mixing the parent base and parent acid in a solvent). In view of the fact that the solutions used to determine the pH contain a polyether, the pH values obtained are "apparent" pH values rather than actual pH values.

Typical of the catalysts useful in the process of this invention are the following acid salts:

| Formula | Name |
|---|---|
| pyridinium dodecylbenzenesulfone | $C_5H_5NH^+C_{12}H_{25}C_6H_4SO_3^-$ |
| pyridinium p-toluenesulfonate | $C_5H_5NH^+CH_3C_6H_4SO_3^-$ |
| pyridinium trifluoromethanesulfonate | $C_5H_5NH^+CF_3SO_3^-$ |
| quinolinium dodecylbenzenesulfonate | $C_9H_7NH^+C_{12}H_{25}C_6H_4SO_3^-$ |
| quinolinium trifluoromethanesulfonate | $C_9H_7NH^+CF_3SO_3^-$ |
| N,N-diethylanilinium dodecylbenzenesulfonate | $(C_2H_5)_2NC_6H_5H^+C_{12}H_{25}C_6H_4SO_3^-$ |
| N,N-diethylanilinium trifluoromethanesulfonate | $(C_2H_5)_2NC_6H_5H^+CF_3SO_3^-$ |
| tridodecylammonium trifluoromethanesulfonate | $(C_{12}H_{25})_3NH^+CF_3SO_3^-$ |
| anilinium p-toluenesulfonate | $C_6H_5NH_3^+CH_3C_6H_4SO_3^-$ |
| trioctylphosphonium dodecylbenzenesulfonate | $(C_8H_{17})_3PH^+C_{12}H_{25}SO_3^-$ |
| anilinium dodecylbenzenesulfonate | $C_6H_5NH_3^+C_{12}H_{25}C_6H_4SO_3^-$ |
| anilinium trifluoromethane sulfonate | $C_6H_5NH_3^+CF_3SO_3^-$ |

The reaction mixtures employed in the process of this invention are at least partially compatible. That is, reactants that are mutually soluble to some extent are employed or a solvent or mixture of solvents in which both reactants and catalysts are at least partially soluble is employed. Suitable solvents include liquid aromatic and aliphatic hydrocarbons such as toluene, heptane, benzene, xylene and octane. Even when such solvents are employed in the process of this invention, the initial reaction mixture may not be completely compatible. Typical solvent-containing reaction mixtures initially consist of two phases, each containing all the starting materials but in different relative amounts. As the reaction proceeds, the reaction mixture becomes homogeneous.

It is desirable to neutralize any non-neutral materials present in the reactants and solvents employed in the process of this invention (e.g., catalysts that had been used in the production of the reactants), particularly when such non-neutral materials are present in relatively large amounts. Neutralization of any basic materials is particularly desirable in the cases of polyoxyalkylene polymer reactants which tend to oxidize fairly readily in the presence of basic materials. Any water present in the starting materials employed in the process of this invention is preferably removed before the starting materials are so employed.

The relative amounts of the components of the reaction mixture used in the process of this invention are not narrowly critical. The alkoxysiloxane reactant is preferably present in an amount of from 15 to 30 parts by weight per 100 parts by weight of the reactants. The acid salt catalyst is preferably present in an amount of from 0.05 to 5.0 parts by weight per 100 parts by weight of the reactants. The solvent is preferably present in an amount of from 30 to 50 parts by weight per 100 parts by weight of the reactants. Preferably, the polyoxyalkylene polymer reactant is employed in an amount that provides from 0.8 to 1.2 hydroxyl group per silicon-bonded alkoxy group in the siloxane reactant.

The process of this invention can be conducted in any suitable manner. It is usually desirable first to mix the polyoxyalkylene reactant (which often contains some water) and a solvent. The polyoxyalkylene reactant can be dehydrated before or after mixing with the solvent. Then, the catalyst can be mixed with the polyoxyalkylene reactant and solvent. Finally, the alkoxysiloxane reactant can be mixed with the other materials to form the reaction mixture. The reaction mixture can be maintained at any suitable temperature (e.g., at a temperature from 100° C. to 135° C.) to effect the transesterification reaction.

During the course of the reaction involved in the process of this invention, an alkanol is produced as a byproduct and is removed from the reaction mixture. The alkanol is conveniently removed from the reaction mixture during the reaction by volatilization. In order to conserve solvent which may also volatilize, it is desirable to reflux the vapors evolved from the reaction mixture that the higher boiling solvent returns to the reaction mixture while the lower boiling alkanol is not returned.

The process of this invention can be conducted so that the transesterification reaction goes to any desired degree of completion. However, it should be recognized that the alkoxysiloxane reactants are defoamers for polyurethane foams. Hence usually it is desirable to conduct the process until an average of at least two, and preferably at least three, silicon-bonded alkoxy groups per molecule of the siloxane reactant have reacted so as to minimize the possible presence of unreacted alkoxysiloxane in the product. It has been found that, in transesterification reactions of the general type involved in the process of the present invention, the formation of a stable foam on the surface of the reaction mixture indicates that the reaction has gone at least partially to completion. The formation of stable foams is consistent with the fact that the block copolymer product is a foam stabilizer in such systems whereas the alkoxysiloxane reactant is a defoamer. The extent of reaction can be more quantitatively followed by measuring the amount of alkanol byproduct produced. When the alkanol byproduct is no longer being produced, it can be assumed that the reaction has gone substantially to completion.

After the reaction has proceeded to the desired extent, the catalyst can be neutralized preferably by adding an alkali metal bicarbonate such as sodium bicarbonate and potassium bicarbonate. The neutralization may produce some insoluble salt which can then be separated from the block copolymer composition product by filtration.

The block copolymer compositions produced by the process of this invention are useful as foam stabilizers for polyurethane foams, e.g., as described in U.S. Pats. 3,194,770 and 3,507,815.

When the catalysts employed in the process of this invention and various prior art catalysts are employed in transesterification reactions that are carried to completion, the reaction times are shorter with the former catalysts. When the reaction does not go to completion and same reaction times are used, the block copolymers produced with the catalysts employed in this invention are more potent polyurethane foam stabilizers. The latter effect is due to the fact that the catalysts employed in the process of this invention are more efficient catalysts for the transesterification reaction and so the reaction goes further toward completion with such catalysts in a given time. Moreover, during the transesterification reaction, the catalysts employed in the process of this invention do not catalyze, to any significant extent, undesirable side reactions which are catalyzed by certain known compounds and which result in the formation of gels. Such undesirable side reactions apparently involve a rearrangement of the siloxane reactants or the siloxane blocks of the desired copolymer to form highly cross-linked siloxane structures.

In the above formulas, the symbols representing the types and groups need not have the same meaning at each occurrence throughout the composition. For example, in a given siloxane represented by Formula 1 above, some of the $R_2SiO$ groups can be dimethylsiloxane groups ($Me_2SiO$) while other of such groups can be beta-phenylethyl(methyl)siloxane groups ($C_6H_5CH_2CH_2SiMeO$) and in a given polymer represented by Formula 2 above, some of the $OC_mH_{2m}$ groups can be oxyethylene groups while other of such groups can be oxypropylene groups.

The term "block copolymer" is used herein to denote a material wherein at least one section ("block") of the molecule is composed of recurring monomeric units of one type and at least one other section ("block") of the molecule is composed of recurring monomeric units of a different type. The different sections or blocks in the molecule can be arranged in any configuration (e.g., $(AB)_n$, AB, ABA, branched, pendant or cyclic) as illustrated by the structures disclosed in U.S. Pats. 2,834,748; 2,917,480; and 3,356,758. Thus the term "block copolymers" as used herein includes graft copolymers. The block copolymers used in this invention can be discrete chemical compounds. Usually, however, the block copolymers are mixtures of various discrete block copolymeric species. The block copolymers are usually mixtures due, at least in part, to the fact that the siloxane and polyoxyalkylene reactants used to produce the block copolymers are themselves usually mixtures.

The following examples illustrate the present invention. In the following examples the terms, abbreviations and symbols used have the indicated meanings.

DEFINITIONS

\*: An asterisk (\*) beside the number of an example appearing below indicates that the example is presented for purpose of comparison and does not illustrate the present invention
%: Percent by weight
Amberlyst XN 1008: a macroreticular cation exchange resin of the nuclear sulfonic acid type supplied by Rohm and Haas Company
approx.: approximately
Bu: butyl
C.: centigrade
conc.: concentration
cstks. or cs.: centistokes at 25° C.
g.: grams
gal.: gallon
Hg: mercury
hr.: hour
in.: inch
lbs.: pounds
Me: methyl
ml.: milliliter
mm.: millimeters
Polyol I: a polyol produced from glycerol and a mixture of 86 weight percent propylene oxide and 14 weight percent ethylene oxide. Polyol I has a hydroxyl number of 46
Polyol II: a polyol produced from glycerol and propylene oxide. Polyol II has a hydroxyl number of 56
TDI: A mixture of 80 weight-percent 2,4-tolylene diisocyanate and 20 weight-percent 2,6-tolylene diisocyanate
visc.: viscosity
wk.: week pH MEASUREMENT

The pH's of the acid salt catalysts employed in the following examples were measured as follows. A solution was formed containing 50 grams of a 0.067 molal solution of the parent base dissolved in the polyether $[C_4H_9(OC_2H_4)_{21}(OC_3H_6)_{16}OH]$. The base-polyether solution was titrated with a 0.090 molal aqueous solution of the parent acid. During the titration, the pH of the base-polyether solution was measured using a standard glass calomel electrode (Beckman Instruments Incorporated, Number 39402). The pH was measured after the addition of each 0.5 cubic centimeters of the aqueous solution up to the point where 35 grams had been added and after the addition of each 0.1 cubic centimeter of the solution thereafter. The measured pH was plotted against the grams of acid solution added to the base-polyether solution. The pH of the acid salt so formed in situ is the pH at the equivalent point as determined from the plot. The equivalent point is the pH corresponding to the maximum inflection on the plot. At the equivalent point, the solution contains 0.0033 gram moles of the acid salt, 37 grams of water and 48 to 50 grams of the polyether.

POLYURETHANE FOAM PROPERTIES

The formulations and procedures for the polyurethane foam tests referred to in the examples are shown below.

TESTS I, II AND III

Formulation

| Material: | Parts by weight |
|---|---|
| Polyol I | 100.0 |
| Distilled water | 4.85 |
| Dimethylethanol amine | 0.35 |
| $CCl_3F$ | 15.0 |
| Stannous octoate | 0.3 |
| TDI | 56.9 |
| Block copolymer: | |
| Test I | 0.90 |
| Test II | 0.60 |
| Test III | 0.50 |

The foams were produced by adding the copolymer to Polyol I in a 1000 ml. container, mixing with a spatula, adding a mixture of the water and amine to the container, adding $CCl_3F$ to the container, mixing with a drill press for 15 seconds, adding the stannous octoate, mixing for 8 seconds with a drill press adding the TDI, mixing with a drill press for 7 seconds, pouring into a mold and curing for 15 minutes at 135° C. Prior to the cure the temperature of the materials was maintained at no higher than 25° C. In view of the differences in the amounts of block copolymer used, Test III is a more rigorous test than Test II and Test II is a more rigorous test than Test I for evaluating the copolymers as polyurethane foam stabilizers.

TESTS IV AND V

Formulation

| Material: | Parts by Weight |
|---|---|
| Polyol II | 100.0 |
| Distilled water | 5.0 |
| Triethylenediamine | 0.1 |
| N-ethylmorpholine | 0.2 |
| Stannous octoate | 0.325 |
| $CCl_3F$ | 3.0 |
| TDI | 56.9 |
| Block copolymer: | |
| Test IV | 0.9 |
| Test V | 0.5 |

The foams were prepared by: adding the copolymer to Polyol II in a 1000 ml. container, mixing with a spatula, adding a mixture of the water and amines to the container, adding the $CCl_3F$ to the container, mixing with a drill press for 15 seconds, adding the stannous octoate, mixing with a drill press for 8 seconds, adding the TDI, mixing with a drill press for 7 seconds, pouring into a mold and curing for 15 minutes at 135° C. Inasmuch as a smaller amount of the block copolymers is used in Test V, Test V is a more rigorous test for evaluating block copolymers as polyurethane foam stabilizers than is Test IV.

Foam evaluation

The following terms are used in the examples in connection with the above-described polyurethane foam tests:

Foam Rise—The Foam Rise is the height of the cured polyurethane foam in inches. A difference in the Foam Rise values of two foams of at least 0.3 inch is considered a significant difference.

Potency—The potency of a siloxane-polyoxyalkylene block copolymer composition denotes the effectiveness of the composition as a polyurethane foam stabilizer. At a given concentration, a more potent composition will result in a polyurethane foam having a higher Foam Rise value.

Cells Per Inch—This denotes the number of cells in the polyurethane foam per linear inch of the foam. The greater the Cells Per Inch value, the finer the cell structure of the foam.

Air Flow—This is the rate of flow of air in standard cubic feet per minute at 0.5 inch water positive pressure through a one inch thick block of foam having a cross-section of two inches by two inches. The Air Flow value is related to the porosity of the foam. The higher the Air Flow value, the more porous the foam.

Failed—This denotes that the composition tested was materials were not completely compatible. If the cloudiness did not tend to diminish significantly after from one to four hours of heating with agitation, it was assumed that the reactions were not proceeding as desired (the desired block copolymer products are clear and homogeneous liquids) and the reactions were terminated at that point. In the case of Examples 3 to 7, 10, 11 and 14, the cloudiness persisted and the reactions were terminated at that point. In the case of the other examples, the cloudiness tended to diminish and so, in those examples, the heating with agitation was continued until foam appeared on the surface of the reaction mixture which indicated that the transesterification reaction had gone at least partially to completion.

After an additional 15 minutes of heating, the reaction mixture was neutralized with sodium bicarbonate and the toluene was removed by distillation. The residue was then filtered to remove the salt formed in the neutralization. The reaction times and residue (copolymer) viscosities are shown in Table I. As noted above, an asterisk (*) beside the number of an example denotes that the example is presented for purpose of comparison and does not illustrate the present invention.

TABLE I

| Example | Catalyst(s) (grams) | Gram, moles | Reaction time (hours) | Copolymer viscosity at 25° C. (cst.) |
|---|---|---|---|---|
| 1 | $C_5H_5NH^+C_{12}H_{25}C_6H_4SO_3^-$ (2.3) | 0.0057 | 0.3 | 996 |
| 2 | $C_5H_5NH^+CF_3SO_3^-$ (1.0) | 0.0044 | 0.2 | 1,117 |
| 3* | $(C_4H_9)_3NH^+CF_3SO_3^-$ (19) | | 1.0 | |
| 4* | $C_{12}H_{25}C_6H_4SO_3H$ (1.6) | | 2.0 | |
| 5* | $CH_3C_6H_4SO_3H$ (0.9) | | 1.5 | |
| 6* | Ion exchange resin Amberlyst XN 1008 (58) | | 2.0 | |
| 7* | $KHSO_4$ (0.7) | | 1.5 | |
| 8* | { $CF_3COOH$ (0.54) <br> $CH_3COOK$ (0.13) } | 0.0047 <br> 0.0013 | 0.75 | 1,209 |
| 9* | { $CF_3COOH$ (0.54) <br> $CF_3COOK$ (0.32) } | 0.0047 <br> 0.0021 | 0.66 | 1,132 |
| 10* | $CF_3COOK$ (0.7) | | 1.5 | |
| 11* | $C_3F_7COOH$ (1.3) | | 1.25 | |
| 12* | { $C_3F_7COOH$ (1.3) <br> $CH_3COOK$ (0.2) } | 0.0061 <br> 0.0013 | 0.5 | 953 |
| 13* | { $C_3F_7COOH$ (1.3) <br> $CF_3COOK$ (0.32) } | 0.0061 <br> 0.0021 | 0.5 | 922 |
| 14* | $NaOCH_3$ (0.0084) | | 4.0 | |
| 15* | $NaOCH_3$ (0.084) | | 1.0 | |
| 16* | $NaO(C_3H_6O)_{18}(C_2H_4O)_{21}C_4H_9$ (0.10) | | 1.0 | | not a polyurethane foam stabilizer in that either no foam was produced or a foam was produced but collapsed.

The polyurethane foams produced as described in the following examples were generally equivalent in terms of their Cells Per Inch and their Air Flow values (i.e., the foams were generally equivalent with regard to their fineness of cell structure and porosity).

EXAMPLES 1 THROUGH 16

A series of polyoxyalkylene-polydimethylsiloxane block copolymers were prepared in accordance with the following procedure: A monohydroxy polyoxyalkylene ether having the average formula:

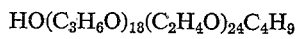

$$HO(C_3H_6O)_{18}(C_2H_4O)_{24}C_4H_9$$

(150 grams), toluene (101 grams) and catalyst(s) were charged to a one-liter, agitated, glass reaction vessel fitted with a distillation column and still head. The solution was heated to reflux and a small amount of contained water in the ether was removed at the still head as a toluene-water azeotrope. An ethoxy end-blocked polydimethylsiloxane fluid having the average formula:

$$(MeSiO_{1.5})_{1.2}(Me_2SiO)_{18}(C_2H_5O_{0.5})_3$$

(39 grams) was added to the solution in the reaction vessel and the resulting mixture was heated to reflux. Ethanol was condensed in the still head that was maintained at partial reflux.

In these examples, the heated and agitated reaction mixtures were initially cloudy due to the fact that the starting The products of Examples 3 to 7, 10, 11 and 14 were incompatible apparently due to substantially incomplete reaction. The products of Examples 15 and 16 contained gels apparently due to rearrangement of the alkoxysiloxane reactant or siloxane blocks in the product to form a highly cross-linked and insoluble siloxane structure. The products of those examples were not suitable for testing as polyurethane foam stabilizers. The products of the other examples were homogeneous liquids that were tested as polyurethane foam stabilizers. The test results appear in Table II.

TABLE II

| | Polyurethane foam properties | | | | | |
|---|---|---|---|---|---|---|
| | Test I | | | Test IV | | |
| Product of Example | Foam rise (inch) | Cells per inch | Air flow | Foam rise (inch) | Cells per inch | Air flow |
| 1 | 11.7 | 34 | 6.0 | 11.1 | 38 | 2.9 |
| 2 | 11.6 | 34 | 6.2 | 11.1 | 36 | 2.4 |
| 8* | 11.5 | 32 | 6.2 | 11.2 | 36 | 3.8 |
| 9* | 11.4 | 34 | 6.0 | 11.2 | 38 | 4.0 |
| 12* | 10.9 | 32 | 6.6 | 10.7 | 38 | 3.4 |
| 13* | 11.5 | 32 | 6.9 | 11.1 | 38 | 4.1 |

As is shown in Table II, the products of Examples 1 and 2 (which illustrate the process of the present invention) were at least as potent as the other products based on the Foam Rise values and, as is shown in Table I, these products were produced in shorter reaction times. In Examples 8, 9 and 13, the catalysts used are among those disclosed in U.S. Pat. 3,133,111 and in Example 11, the catalyst used in one of the catalysts disclosed in U.S. Pat. 2,917,480.

presented for purpose of comparison and does not illustrate the present invention.

TABLE III

| Example | Catalyst(s) (grams) | pH | Reaction time (hours) | Copolymer viscosity at 25° C. (cst.) |
|---|---|---|---|---|
| 17* | {CF₃COOH (0.17) / CH₃COOK (0.16)} | ¹ 3.65 | 2.7 | 1310 |
| 18* | (C₂H₅)₃NH⁺C₁₂H₂₅C₆H₄SO₃ (0.70) | 5.80 | 4.0 | (²) |
| 19* | (C₂H₅)₃NH⁺CH₃C₆H₄SO₃ (0.59) | 5.75 | 4.0 | (²) |
| 20* | (C₂H₅)₃NH⁺CF₃SO₃ (0.42) | 5.70 | 4.0 | (²) |
| 21* | (CH₃)₃C₅H₂NH⁺CH₃C₆H₄SO₃ (.062) | 3.75 | 2.67 | 1170 |
| 22* | 1,3,5-(CH₃)₃C₅H₂NH⁺CF₃SO₃ (0.45) | 3.70 | 3.25 | 1320 |
| 23* | 1,3,5-(CH₃)₃C₅H₂NH⁺C₁₂H₂₅C₆H₄SO₃ (0.73) | 3.65 | 2.67 | 1020 |
| 24 | (C₂H₅)₂NC₆H₅H⁺C₁₂H₂₅C₆H₄SO₃ (0.79) | 3.40 | 1.5 | 1250 |
| 25 | C₅H₅NH⁺CF₃SO₃ (0.42) | 3.10 | 1.75 | 1180 |
| 26 | C₅H₅NH⁺C₁₂H₂₅C₆H₄SO₃ (0.70) | 3.10 | 1.75 | 1370 |
| 27 | C₅H₅NH⁺CH₃C₆H₄SO₃ (0.59) | 3.00 | 1.5 | 1160 |
| 28 | (C₂H₅)₂NC₆H₅H⁺CF₃SO₃ (0.51) | 2.90 | 2.0 | 1460 |
| 29 | C₉H₇NH⁺C₁₂H₂₅C₆H₄SO₃ (0.75) | 2.55 | 1.75 | 1270 |
| 30 | C₉H₇NH⁺HCF₃SO₃ (0.47) | 2.40 | 1.25 | 1360 |
| 31* | C₉H₇NH⁺CH₃C₆H₄SO₃ (0.64) | 2.30 | 2.25 | 1120 |
| 32* | C₅H₅NH⁺SO₄H⁺ | 2.30 | 1.67 | 1205 |

¹ Approx.
² Sufficient reaction to produce a homogeneous copolymer was not achieved.

TABLE IV

| Product of Example | Polyurethane foam properties | | | | | | | | |
|---|---|---|---|---|---|---|---|---|---|
| | Test I | | | Test III | | | Test IV | | |
| | Foam rise (in.) | Cells per inch | Air flow | Foam rise (in.) | Cells per inch | Air flow | Foam rise (in.) | Cells per inch | Air flow |
| 17* | 12.2 | 34 | 5.9 | 11.1 | 32 | 6.3 | 11.3 | 36 | 2.4 |
| 21* | 12.1 | 34 | 6.2 | 11.2 | 32 | 5.8 | 11.3 | 34 | 1.8 |
| 22* | 12.2 | 34 | 5.7 | 11.3 | 32 | 6.0 | 11.1 | 34 | 1.8 |
| 23* | 12.3 | 34 | 6.4 | 11.4 | 32 | 5.7 | 11.2 | 26 | 0.8 |
| 24 | 12.6 | 34 | 5.6 | 11.4 | 40 | 2.5 | 11.7 | 30 | 5.0 |
| 25 | 12.2 | 34 | 5.6 | 11.5 | 32 | 5.9 | 11.1 | 32 | 1.6 |
| 26 | 12.3 | 34 | 6.1 | 11.7 | 32 | 6.4 | 11.2 | 36 | 2.1 |
| 27 | 12.6 | 34 | 5.4 | 11.4 | 38 | 2.7 | 11.7 | 30 | 4.8 |
| 28 | 12.2 | 34 | 6.3 | 11.6 | 32 | 5.7 | 11.5 | 28 | 1.1 |
| 29 | 12.3 | 34 | 6.1 | 11.2 | 28 | 5.2 | 11.4 | 38 | 2.4 |
| 30 | 12.4 | 34 | 6.2 | 11.7 | 32 | 6.0 | 11.1 | 30 | 1.6 |
| 31* | Failed | 34 | | Not run | | | Not run | | |
| 32* | 12.2 | 34 | 5.0 | Not run | | | 11.4 | 38 | 2.5 |

EXAMPLES 17 THROUGH 32

The following examples distinguish the class of compounds useful as catalysts in this invention from other compounds and mixtures of compounds.

A series of polyoxyalkylene ether-polydimethylsiloxane block copolymers were prepared in accordance with the following procedure. A monohydroxy polyoxyalkylene ether having the average formula:

$$HO(C_3H_6O)_{18}(C_2H_4O)_{24}C_4H_9$$

(120 grams), toluene (80 grams) and catalyst(s) (0.0016 gram moles) were charged to a one-liter agitated, glass reaction vessel fitted with a distillation column and still head. The solution was heated to reflux and a small amount of contained water in the ether was removed at the still head as a toluene water azeotrope. An ethoxy endblocked polydimethylsiloxane fluid having the average formula:

$$(MeSiO_{1.5})_{1.2}(Me_2SiO)_{18}(C_2H_5O_{0.5})_3$$

(29.5 grams) and toluene (8.7 grams) were added to the solution in the reaction vessel and the resulting mixture was heated to reflux. Ethanol was concentrated in the still head that was maintained at partial reflux. The reaction was continued until foam appeared on the surface of the reaction mixture which indicated that the transesterification reaction had gone at least partially to completion. After heating an additional 30 minutes, the reaction mixture was neutralized with sodium bicarbonate and the toluene removed by distillation. The residue was then filtered to remove the salt. The resulting homogeneous liquid residues were characterized by viscosity at 25° C. and ability to stabilize polyurethane foam in one or more of the tests described above. A comparison of reaction times, the copolymer properties and properties of the resulting polyurethane foams is shown in the attached Tables III and IV. As noted above, an asterisk (*) beside the number of an example denotes that the example is presented for purpose of comparison and does not illustrate the present invention.

The results shown in Tables III and IV indicate that "catalysts" having a pH greater than 3.6 either do not produce the desired homogeneous liquid products or produce such products only after relatively long reaction times. These results also indicate that catalysts having a pH lower than 2.4 may produce products that are not polyurethane foam stabilizers (Example 31) or products that are polyurethane foam stabilizers (Example 32).

EXAMPLES 33 THROUGH 37

These examples show the use of additional catalysts in the process of this invention.

A series of polyoxyalkylene-polydimethylsiloxane block copolymers were prepared in accordance with the following procedure: A monohydroxy polyoxyalkylene ether having the average formula:

$$HO(C_3H_6O)_{18}(C_2H_4O)_{24}C_4H_9$$

(150 grams), toluene (100 grams) and catalyst (0.0016 gram moles) were charged to a one-liter, agitated glass vessel fitted with a distillation column and still head. The solution was heated to reflux and a small amount of contained water in the ether was removed at the still head as a toluene water azeotrope. An ethoxy endblocked polydimethylsiloxane fluid having the average formula:

$$(MeSiO_{1.5})_{1.2}(Me_2SiO)_{18}(C_2H_5O_{0.5})_3$$

(38.3 grams) and toluene (23 grams) were added to the solution in the reaction vessel and the resulting mixture was heated to reflux. Ethanol was concentrated in the still head that was maintained at partial reflux. The reaction was continued until ethanol was no longer evident in the still head which indicated that the transesterification reaction had gone substantially to completion. The reaction mixture was neutralized with sodium bicarbonate and the toluene removed by distillation. The residue was then filtered to remove the salts. The resulting homogeneous liquid residues were characterized by viscosity at 25° C. and ability to stabilize polyurethane foam in one or more of the tests described above. A comparison of reaction times, copolymer properties and properties of the resulting polyurethane foams is shown in Tables V and VI.

foam in the above described foam tests, I, III and IV. Copolymer viscosity and foam properties are shown in Table VII.

TABLE VII

| | Copolymer viscosity at 25° C. (cst.) | Polyurethane foam properties | | | | | | | | |
|---|---|---|---|---|---|---|---|---|---|---|
| | | Test I | | | Test II | | | Test IV | | |
| Example | | Foam rise (in.) | Cells per inch | Air flow | Foam rise (in.) | Cells per inch | Air flow | Foam rise (in.) | Cells per inch | Air flow |
| 38 | 1,026 | 12.6 | 34 | 8.1 | 11.7 | 34 | 9.0 | 11.5 | 40 | 2.0 |
| 39 | 1,105 | 12.3 | 32 | 6.2 | 11.6 | 28 | 5.7 | 11.3 | 36 | 1.4 |
| 40 | 931 | 12.2 | 34 | 6.7 | 11.5 | 30 | 6.0 | 11.2 | 40 | 2.3 |

TABLE V

| Example | Catalyst | pH | Reaction time (hours) | Copolymer viscosity at 25° C. (cst.) |
|---|---|---|---|---|
| 33 | C₆H₅NH₃⁺CH₃C₆H₄SO₃⁻ | 2.5 | 2.25 | 1,175 |
| 34 | (C₈H₇)₃PH⁺C₁₂H₂₅C₆H₄SO₃⁻ | 2.4 | 1.0 | 1,100 |
| 35 | C₆H₅NH₃⁺C₁₂H₂₅C₆H₄SO₃⁻ | 2.8 | 2.0 | 1,150 |
| 36 | C₆H₅NH₃⁺CF₃SO₃⁻ | 2.5 | 1.67 | 730 |
| 37 | (C₁₂H₂₅)₃NH⁺CF₃SO₃⁻ | 3.6 | 2.35 | 790 |

TABLE VI

| | Polyurethane foam properties | | | | | | | | |
|---|---|---|---|---|---|---|---|---|---|
| | Test I | | | Test III | | | Test IV | | |
| Product of Example | Foam rise (in.) | Cells per inch | Air flow | Foam rise (in.) | Cells per inch | Air flow | Foam rise (in.) | Cells per inch | Air flow |
| 33 | 12.6 | 34 | 6.2 | 12.1 | 32 | 6.6 | 11.4 | 32 | 6.6 |
| 34 | 12.5 | 34 | 5.4 | 11.6 | 30 | 3.6 | 11.4 | 28 | 3.2 |
| 35 | 11.8 | 34 | 4.5 | 11.1 | 30 | 3.4 | 11.2 | 28 | 2.3 |
| 36 | 11.5 | 32 | 5.1 | Failed | | | 10.4 | 36 | 4.0 |
| 37 | 12.5 | 34 | 6.4 | 11.8 | 34 | 6.2 | 11.2 | 36 | 2.4 |

The results shown in Tables V and VI indicate that the block copolymers produced in these examples were produced in relatively short times and were good polyurethane foam stabilizers.

EXAMPLES 38 TO 40

These examples were conducted following the procedure of the Examples 33 to 37 modified to the extent that the reaction vessel was not equipped with a distillation column. In each of Examples 38, 39 and 40, substantially the same reaction conditions and starting materials were employed.

Three polyoxyalkylene polydimethylsiloxane copolymers were prepared by the following procedure:

A monohydroxy polyoxyalkylene ether having the average formula:

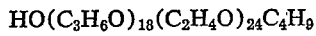

$$HO(C_3H_6O)_{18}(C_2H_4O)_{24}C_4H_9$$

(150 grams) and toluene (283 grams) were heated to reflux in a one-liter, agitated glass reaction vessel fitted with a still head (no distillation column). A small amount of contained water was removed at the still head. Pyridinium dodeceylbenzenesulfonate (0.3 gram) and an ethoxy endblocked dimethylsiloxane fluid having the average formula:

$$(MeSiO_{1.5})_{1.2}(Me_2SiO)_{18}(C_2H_5O_{0.5})_3$$

(38.7 grams) were added to the reactor and the resulting mixture was heated to reflux.

Toluene containing a low concentration of ethanol was taken from the still head at a rate of 0.9 cubic centimeters per minute. The reaction was continued for 4.2 hours until the reaction mixture foamed indicating that the transesterification reaction had gone at least partly to completion. The reaction mixture was neutralized with sodium bicarbonate and the remaining toluene was removed at the still head. The residue was then filtered to remove salts. The filtered liquid residue was characterized by viscosity and its ability to stabilize polyurethane foam in the above described foam tests, I, III and IV. Copolymer viscosity and foam properties are shown in Table VII.

The results shown in Table VII indicate that the block copolymers were good polyurethane foam stabilizers. The modification in the process shown in Examples 38, 39 and 40 allows ethanol to be removed as formed due to the constant removal of toluene. Relatively volatile prior art catalysts (e.g., trifluoroacetic acid), if used in this technique, would be distilled from the reaction mixture. This technique offers little advantage for batch systems but could be of utility in a continuous process where the reaction would be driven to completion by rapid removal of toluene from a small amount of reaction mixture flowing through an evaporator.

Experience with transesterification reactions of the type involved in the process of the present invention has shown that the time required to achieve foaming of the reaction mixture or cessation of evolution of the alkanol byproduct is a function of the scale on which the reaction is conducted. That is, a considerably longer period of time is required on a plant scale than is required on a laboratory scale to achieve these "end points." This effect is borne out by the following examples which were carried out on a larger scale than on the previous examples.

EXAMPLES 41 AND 42

These examples show the advantages of a catalyst used in the present invention over a prior art catalyst system (i.e., trifluoroacetic acid and potassium acetate) in small production equipment. In these examples, the reaction mixtures were heated until the products had substantially the same potency as polyurethane foam stabilizers.

Two copolymers were prepared in accordance with the following procedure. A monohydroxy polyoxyalkylene ether having the average formula:

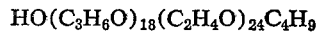

$$HO(C_3H_6O)_{18}(C_2H_4O)_{24}C_4H_9$$

(100 pounds) was heated to 100° C. in a 50 gallon glass lined Pfaudler reactor fitted with a 4 foot length x 4 inch diameter distillation column packed with 0.5 inch ceramic saddles and a distillation head. Pressure in the reactor was reduced to less than 50 mm. Hg. absolute and a small amount of contained water in the ether was removed at the still head. The catalyst(s), an ethoxy endblocked dimethylsiloxane fluid having the average formula:

$$(MeSiO_{1.5})_{1.2}(Me_2SiO)_{18}(C_2H_5O_{0.5})_3$$

(29 pounds) and toluene (16 gallons) were added to the reactor and the resulting mixture was heated to reflux (about 120–135° C.) at atmospheric pressure. Ethanol began to evolve almost immediately. The ethanol was concentrated in the still head and was distilled as a toluene-ethanol azeotrope. Aliquots were periodically removed from the reactor and processed as follows: the solution was charged to a one-liter, agitated flask fitted with a sparge tube and distilling head, neutralized with sodium bicarbonate and the toluene was removed by distillation. The residue was then filtered to remove salts. The filtered liquid residue was characterized by viscosity and its ability to stabilize polyurethane foams in Test III described above. A comparison of a copolymer prepared with trifluoroacetic acid/potassium acetate and a copolymer prepared with pyridinium dodecylbenzene-sulfonate, the time required to produce copolymers with about the same potency and the properties of the resulting polyurethane foams is shown in Table VIII.

TABLE VIII

| Ex. | Catalyst(s) | Reaction time (hrs.) | Polyurethane foam properties, Test III | | |
|---|---|---|---|---|---|
| | | | Foam rise (inch) | Cells per linear inch | Air flow |
| 41* | $CF_3COOH$ (71 grams) (0.68 gram moles), and $CH_3COOK$ (49 grams) (0.50 gram moles). | 11 | 11.7 | 32 | 5.9 |
| 42 | $C_5H_5NH^+C_{12}H_{25}C_6H_4SO_3^-$ (240 grams) (0.6 gram moles). | 3 | 11.7 | 30 | 5.3 |

The data shown in Table VIII indicate that the novel process produced a potent foam stabilizer in less than one-third the time required using the prior art process.

EXAMPLES 43 THROUGH 56

The following examples show the advantages of a catalyst used in the present invention over trifluoroacetic acid-potassium acetate in large scale equipment.

A series of polyoxyalkylene polydimethylsiloxane block copolymers were prepared in accordance with the following procedure. A monohydroxy polyoxyalkylene ether having the average formula:

$$HO(C_3H_6O)_{18}(C_2H_4O)_{24}C_4H_9$$

(8,075 pounds) was heated to 100° C. in a 2,000 gallon reactor fitted with a 9 foot length by 20 inch diameter distillation column packed with 1 inch ceramic saddles. The pressure in the reactor was reduced to less than 100 mm. Hg absolute and sparged with nitrogen. Water contained in the ether was removed at the still head. The reactor pressure was returned to atmospheric pressure. Toluene (6,840 pounds), an ethoxy endblocked polydimethylsiloxane fluid having the average formula:

$$(MeSiO_{1.5})_{1.2}(Me_2SiO)_{16}(C_2H_5O_{4.5})_3$$

(2,100 pounds), and catalyst were added to the reactor. The resulting mixture was heated to reflux (125–130° C.) at atmospheric pressure. Ethanol began to evolve almost immediately. The ethanol was concentrated in the still head that was maintained at partial reflux. The reaction was continued until foam appeared on the surface of the reaction mixture which indicated that the transesterification reaction had gone at least partially to completion. After an additional 15 minutes heating, the reaction mixture was neutralized with sodium bicarbonate and the toluene was removed by distillation. The residue was filtered to remove salts.

A comparison of copolymers produced with trifluoroacetic acid/potassium acetate with copolymers produced with pyridinium dodecylbenzenesulfonate, the time required to produce the copolymers and the properties of the resulting polyurethane foam is shown in Tables IX and X.

TABLE IX

| Example | Catalyst(s) | Reaction time (hrs.) | Copolymer viscosity at 25° C. (cst.) |
|---|---|---|---|
| 43* | $CF_3COOH$ (18 lb.) (0.16 lb. moles). And $CH_3COOK$ (7 lb.) (0.07 lb. mole). | 5.5 | 1,059 |
| 44* | | 5.5 | 1,022 |
| 45* | | 5.5 | 997 |
| 46* | | 6.0 | --- |
| 47* | | 6.0 | 999 |
| 48* | | 5.5 | 989 |
| 49* | | 5.0 | 970 |
| 50 | $C_5H_5NH^+C_{12}H_{25}C_6H_4SO_3^-$ (20 lb.) (0.05 lb. moles). | 6.0 | 970 |
| 51 | | 7.0 | 913 |
| 52 | | 6.5 | 778 |
| 53 | | 7.5 | 905 |
| 54 | | 8.5 | 922 |
| 55 | | 8.0 | 927 |
| 56 | | 6.0 | 899 |

TABLE X

| Product of Example | Polyurethane foam properties | | | | | |
|---|---|---|---|---|---|---|
| | Test I | | | Test II | | |
| | Foam rise (inch) | Cells per inch | Air flow | Foam rise (inch) | Cells per inch | Air flow |
| 43* | 11.7 | 34 | 6.3 | Not run | | |
| 44* | 11.7 | 34 | 6.5 | Not run | | |
| 45* | 11.6 | 32 | 6.7 | Not run | | |
| 46* | 11.6 | 32 | 5.9 | Not run | | |
| 47* | 11.7 | 34 | 6.7 | Not run | | |
| 48* | 11.5 | 34 | 6.8 | Not run | | |
| 49* | 11.4 | 32 | 5.0 | Not run | | |
| 50 | 12.4 | 34 | 5.5 | 11.6 | 30 | 6.6 |
| 51 | 12.4 | 34 | 6.1 | 11.6 | 32 | 6.4 |
| 52 | 12.0 | 34 | 6.9 | Not run | | |
| 53 | 12.2 | 34 | 6.8 | Not run | | |
| 54 | 12.3 | 34 | 5.3 | 11.4 | 32 | 7.8 |
| 55 | 12.4 | 34 | 5.7 | Not run | | |
| 56 | 12.3 | 34 | 5.8 | 11.6 | 32 | 5.1 |

In Test I the products of Examples 43 to 49 (where a prior art catalyst system was employed) were in all cases less potent foam stabilizers than the products produced in accordance with the process of the present invention. Examples 46 and 47 are most comparable to Examples 50 and 56 inasmuch as in those four examples the reaction times were the same (six hours).

EXAMPLES 57 TO 68

Another series of copolymers were prepared in a 4,000 gallon reactor in accordance with the procedure of Examples 43 to 56 with the exception that the weights of reactants and toluene were increased by multiplying the above indicated weights used in Examples 43 to 56 by 1.8. The properties of these copolymers, the time required to produce the copolymers, and properties of the resulting polyurethane foams are shown in Tables XI and XII.

TABLE XI

| Example | Catalyst(s) | Reaction time (hrs.) | Copolymer viscosity at 25° C. (cst.) |
|---|---|---|---|
| 57 | $C_5H_5NH^+C_{12}H_{25}C_6H_4SO_3^-$ (36 lb.) (0.09 lb. moles). | 9.0 | 956 |
| 58 | | 8.0 | 1,077 |
| 59 | | 12.0 | 1,084 |
| 60 | | 7.0 | 1,039 |
| 61 | | 8.0 | 1,030 |
| 62 | | 7.09 | 1,048 |
| 63 | | 7.0 | 1,061 |
| 64 | | 9.0 | 1,088 |
| 65 | | 8.0 | 1,072 |
| 66 | | 9.0 | 1,123 |
| 67 | | 8.5 | 1,128 |
| 68 | | 8.0 | 1,188 |

TABLE XII

Polyurethane foam properties

| Product of Example | Test I | | | Test II | | |
|---|---|---|---|---|---|---|
| | Foam rise (inch) | Cells per inch | Air flow | Foam rise (inch) | Cells per inch | Air flow |
| 57 | 12.3 | 34 | 6.0 | 11.5 | 32 | 5.3 |
| 58 | 12.2 | 32 | 6.3 | 11.7 | 32 | 5.0 |
| 59 | 12.8 | 34 | 4.9 | 12.0 | 30 | 5.7 |
| 60 | 12.4 | 34 | 6.2 | Not run | | |
| 61 | 12.3 | 34 | 6.7 | 11.9 | 34 | 6.3 |
| 62 | 12.4 | 34 | 7.1 | 11.7 | 32 | 6.2 |
| 63 | 12.4 | 34 | 6.1 | 11.6 | 32 | 5.0 |
| 64 | 12.5 | 34 | 6.2 | 11.7 | 32 | 6.3 |
| 65 | 12.6 | 32 | 5.0 | Not run | | |
| 66 | 12.4 | 32 | 53.5 | 11.6 | 32 | 5.5 |
| 67 | 12.4 | 34 | 5.9 | 11.8 | 34 | 6.7 |
| 68 | 12.5 | 34 | 6.2 | 11.8 | 32 | 6.9 |

The data shown in Tables XI and XII indicates that good polyurethane foam stabilizers were produced in reasonably short periods of time considering the scale on which the reactions were conducted.

EXAMPLES 69 THROUGH 87

The following examples further show the advantages of a catalyst used in the present invention over a trifluoroacetic acid-potassium acetate catalyst mixture in large scale equipment.

A series of polyoxyalkylene ether-polydimethylsiloxane block copolymers were prepared in accordance with the following procedure.

A monohydroxy polyoxyalkylene ether having the average formula:

$$HO(C_3H_6O)_{18}(C_2H_4O)_{24}C_4H_9$$

(6,255 pounds) was heated to 100° C. in a 2,000 gallon reactor fitted with a 9 foot length by 20 inch diameter distillation column packed with 1 inch ceramic saddles. The pressure in the reactor was reduced to less than 100 mm. Hg absolute and sparged with nitrogen. Water contained in the ether was removed at the still head. The reactor pressure was returned to atmospheric pressure. Toluene (6,840 pounds), an ethoxy endblocked polydimethylsiloxane fluid having the average formula:

$$(MeSiO_{1.5})_{1.2}(Me_2SiO)_{18}(C_2H_5O_{0.5})_3$$

(2,000 pounds), and catalyst were added to the reactor. The resulting mixture was heated to reflux (125–130° C.) at atmospheric pressure. Ethanol began to evolve almost immediately. The ethanol was concentrated in the still head that was maintained at partial reflux. The reaction was continued until aliquot portions of the reaction mixture gave a Foam Rise of 11.6 inches in Test III. The reaction mixture was then neutralized with sodium bicarbonate and the toluene was removed by distillation. The residue was filtered to remove salts.

A comparison of copolymers produced with trifluoroacetic acid/potassium acetate with copolymers produced with the disclosed catalysts, the time required to produce the copolymers and the properties of the resulting polyurethane foams is shown in Tables XIII and XIV.

TABLE XIII

| Ex. | Catalyst(s) | Reaction time (hrs.) | Copolymer viscosity at 25° C. (cst.) |
|---|---|---|---|
| 69* | CF$_3$COOH (18 lbs.) (0.16 lb. moles), and CH$_3$COOK (7 lbs.) (0.07 lb. moles). | 23.0 | 1,281 |
| 70* | | 26.0 | 1,318 |
| 71* | | 21.0 | 1,410 |
| 72* | | 19.5 | 1,339 |
| 73* | | 26.0 | 1,210 |
| 74 | | 15.0 | 1,149 |
| 75 | | 14.5 | 1,297 |
| 76 | | 13.5 | 1,260 |
| 77 | | 13.5 | 1,246 |
| 78 | | 13.5 | 1,238 |
| 79 | | 12.5 | 1,242 |
| 80 | C$_5$H$_5$NH+C$_{12}$H$_{25}$C$_6$H$_4$SO$_3^-$ (20 lbs.) (0.05 lb. moles). | 12.5 | 1,276 |
| 81 | | 12.0 | 1,260 |
| 82 | | 11.0 | 1,319 |
| 83 | | 16.0 | 1,315 |
| 84 | | 11.0 | 1,315 |
| 85 | | 14.5 | 1,487 |
| 86 | | 13.0 | 1,281 |
| 87 | | 11.5 | 1,230 |

TABLE XIV

Polyurethane foam properties

| Product of Example | Test III | | | Test V | | |
|---|---|---|---|---|---|---|
| | Foam rise (inch) | Cells per inch | Air flow | Foam rise (inch) | Cells per inch | Air flow |
| 69* | 12.0 | 30 | 5.1 | 11.0 | 36 | 3.0 |
| 70* | 11.7 | 32 | 4.5 | 11.0 | 36 | 2.8 |
| 71* | 11.6 | 32 | 6.3 | 10.9 | 28 | 3.2 |
| 72* | 11.9 | 32 | 4.7 | 11.0 | 40 | 3.9 |
| 73* | 11.7 | 32 | 6.0 | 10.8 | 30 | 1.6 |
| 74 | 11.8 | 32 | 6.0 | 10.9 | 32 | 2.4 |
| 75 | 11.8 | 32 | 4.4 | 11.0 | 38 | 2.8 |
| 76 | 11.7 | 32 | 5.6 | 11.0 | 38 | 5.6 |
| 77 | 11.8 | 32 | 5.3 | 10.9 | 36 | 2.8 |
| 78 | 11.7 | 32 | 7.6 | 10.9 | 36 | 3.6 |
| 79 | 12.0 | 34 | 5.8 | 11.0 | 36 | 3.9 |
| 80 | 11.9 | 32 | 4.3 | 11.0 | 38 | 2.6 |
| 81 | 11.7 | 32 | 5.0 | 10.5 | 38 | 3.0 |
| 82 | 11.7 | 32 | 5.4 | 10.6 | 38 | 2.7 |
| 83 | 11.9 | 32 | 4.2 | 10.9 | 36 | 2.9 |
| 84 | 11.7 | 32 | 5.2 | 10.7 | 32 | 2.5 |
| 85 | 11.8 | 32 | 6.2 | 10.9 | 36 | 2.8 |
| 86 | 11.9 | 32 | 5.3 | 10.8 | 36 | 2.8 |
| 87 | 11.9 | 32 | 5.8 | 10.6 | 36 | 3.0 |

It should be noted that the amount of the prior art catalyst system used in Examples 69 to 73 was greater on a pound mole basis than the amount of the novel catalysts used in Examples 74 to 87. Nonetheless, equally potent polyurethane foam stabilizers were produced in Examples 74 to 87 in a shorter period of time.

EXAMPLES 88 THROUGH 94

These examples illustrate the elevation in Cloud Point imparted to block copolymers by certain sodium salts produced by neutralizing the acid salt catalysts employed in the process of this invention.

Water-soluble siloxane-polyoxyalkylene block copolymers are characterized by inverse water solubility. That is, the block copolymers are soluble in water at relatively low temperatures but become insoluble at higher temperatures. When the temperature of such an aqueous solution is raised to the point where the block copolymer becomes insoluble, the block copolymer-water mixture becomes cloudy. Hence, this temperature is called the "Cloud Point" of the block copolymer.

In Examples 88 to 94, the Cloud Points of the neutralized products were measured as follows: A clear aqueous solution was formed at about 25° C. containing one gram of the neutralized product and 99 grams of distilled water. The aqueous solution was placed in a 150 milliliter glass beaker equipped with a stirrer and with a thermometer. The thermometer was mounted in the center of the beaker so that the lower portion thereof was immersed in the solution and was close to, but not in contact with the bottom of the beaker. The solution was slowly heated. The temperature at which the solution became so cloudy that the thermometer could no longer be seen was taken as the Cloud Point of the product.

A series of block copolymers were produced by a prior art process (i.e., Example 88 in which trifluoroacetic acid was employed as a catalyst) and by the process of this invention (Examples 89 to 94 in which pyridinium dodecylbenzene sulfonate was used as a catalyst). The reactants and reaction conditions used in Examples 88 to 94 were essentially the same as the reactants and reaction conditions used in Examples 17 to 32 above. In the case of Examples 89 to 94, the neutralized liquid product contained sodium dodecylbenzene sulfonate produced by the neutralization of the acid salt catalyst. The amount of catalyst employed and the Cloud Point, viscosity and silicon-bonded ethoxy content of the products of these examples are shown in Table XV.

TABLE XV

| Example | Catalyst conc., percent | Product Cloud point, °C. | Product Viscosity, cst. at 25° C. | Product Percent OC₂H₅ |
|---|---|---|---|---|
| 88* | 0.18 | 39 | 947 | 0.13 |
| 89ᵃ | 0.10 | 40 | 868 | 0.15 |
| 90ᵃ | 0.10 | 40 | 963 | 0.13 |
| 91 | 0.20 | 44 | 903 | 0.15 |
| 92 | 0.30 | 100 | 854 | 0.17 |
| 93ᵃ | 0.40 | 100 | 950 | 0.12 |
| 94ᵃ | 0.40 | 100 | 919 | 0.14 |

ᵃ Duplicate runs.

The results in Table XV indicate that the products containing sodium dodecylbenzene sulfonate (formed in situ by neutralizing the catalyst) have higher Cloud Points. Such products are disclosed and claimed in copending U.S. patent application Ser. No. 233,723, filed concurrently herewith in the names of John J. Walsh and Carl J. Litteral entitled "Block Copolymer Compositions Having Improved Cloud Points."

The properties of the polyurethane foams produced from the products of Examples 88 to 94 are shown in Table XVI below.

TABLE XVI

| Product of Example | Polyurethane foam properties Test I Foam rise (inch) | Test I Cells per inch | Test I Air flow | Test III Foam rise (inch) | Test III Cells per inch | Test III Air flow |
|---|---|---|---|---|---|---|
| 88* | 11.9 | 32 | 6.9 | 10.7 | 24 | 6.5 |
| 89 | 12.1 | 34 | 7.8 | 11.6 | 32 | 6.9 |
| 90 | 12.3 | 32 | 7.9 | 11.5 | 30 | 7.7 |
| 91 | 12.2 | 34 | 7.2 | 11.3 | 32 | 7.6 |
| 92 | 12.1 | 34 | 8.3 | 11.2 | 30 | 6.7 |
| 93 | 12.2 | 34 | 7.7 | 11.2 | 28 | 6.5 |
| 94 | 12.1 | 34 | 7.6 | 11.1 | 28 | 5.6 |

The data shown in Table XVI indicates that the products of the process of this invention produced block copolymers that were more potent foam stabilizers than block copolymers produced by prior art process.

The Cloud Points of the neutralized products of the other examples were measured as described above and appear in Table XVII.

TABLE XVII

| Product of Example— | Cloud Point (° C.) |
|---|---|
| 17 | 40 |
| 21 | 40 |
| 22 | 39 |
| 23 | 42 |
| 24 | >90 |
| 25 | 40 |
| 26 | ---- |
| 27 | 40 |
| 28 | 40 |
| 29 | >90 |
| 30 | 39 |
| 31 | 39 |
| 32 | 40 |

The polyoxyalkylene polymer reactant used in all the above examples had the average formula shown above and was produced by mixing 78 weight percent $$HO(C_3H_6O)_{16}(C_2H_4O)_{21}C_4H_9$$

and 22 weight percent $HO(C_3H_6O)_{27}(C_2H_4O)_{36}C_4H_9$.

In all the above examples, the reaction mixtures were neutralized after the reaction had gone to the desired extent employing a large excess of sodium bicarbonate. A solid residue was present after neutralization which included the excess sodium bicarbonate. The neutralization involved the conversion of the acid salt catalyst to the corresponding sodium salt. In those cases where the latter salts were at least partially insoluble in the products, the solid residue also included those salts. Some of the salts formed in the neutralization were at least partially soluble in the products and imparted improved properties to the products when present in significant amounts (e.g., the salts markedly raised the Cloud Points of the products). The neutralization of the reaction mixtures also regenerated the parent amines that had been used to produce the acid salt catalysts. In the case of relatively volatile amines, the regenerated amines were volatilized from the reaction mixture along with the solvent and, in the case of relatively non-volatile amines, the regenerated amines remained in the product.

What is claimed is:

1. A process for producing a liquid siloxane-polyoxyalkylene block copolymer which comprises: (I) forming an at least partially compatible reaction mixture containing: (a) a siloxane reactant having at least one silicon-bonded alkoxy group, each such alkoxy group containing from 1 to 12 carbon atoms inclusive, and having silicon-bonded monovalent hydrocarbon groups, each such hydrocarbon group containing from 1 to 14 carbon atoms inclusive, (b) a polyoxyalkylene polymer reactant having at least one alcoholic hydroxyl group, and (c) an acid salt catalyst, said catalyst being characterized by the ability to form a solution that consists of 0.0033 gram moles of said catalyst, 37 grams of water and 48 to 50 grams of a polyether having the average formula $$C_4H_9(OC_2H_4)_{21}(OC_3H_6)_{16}OH$$

and that has an apparent pH from 2.4 to 3.6 inclusive; and (II) maintaining the reaction mixture at a temperature at which (a) and (b) react to form the liquid siloxane-polyoxyalkylene block copolymer and an alkanol byproduct while removing the alkanol byproduct from the reaction mixture.

2. A process as claimed in claim 1 wherein the siloxane reactant is represented by the average formula:

$$(R_3SiO_{0.5})_a(R_2SiO)_b(RSiO_{1.5})_c(R'O_{0.5})_d$$

where R represents a monovalent hydrocarbon group containing from 1 to 14 carbon atoms inclusive, R' is an alkyl group containing from 1 to 12 carbon atoms inclusive, $a$ and $c$ each have a value of at least 0, $b$ has a value of at least 5, and $d$ has a value of at least 1, wherein the polyoxyalkylene polymer reactant is represented by the average formula:

$$R''(OC_mH_{2m})_nOH$$

where R'' is a hydrogen or a monovalent hydrocarbon group containing from 1 to 14 carbon atoms inclusive, $m$ has a value of at least 2 and $n$ has a value of at least 5, and wherein the reaction mixture contains a liquid hydrocarbon in which the reactants are at least partially soluble.

3. A process as claimed in claim 2 wherein $a$ has a value from 0 to 4 inclusive, $b$ has a value from 10 to 75 inclusive, $c$ has a value from 1 to 5 inclusive, $d$ has a value from 2 to 7 inclusive, each R is a methyl group, each R' is a methyl or ethyl group, $(OC_mH_{2m})_n$ represents polyoxyethylene or poly(oxyethylene-oxypropylene), $n$ has a value from 10 to 40 inclusive. R'' is an alkyl group having from 1 to 4 carbon atoms inclusive and the solvent is a liquid aromatic hydrocarbon.

4. A process as claimed in claim 1 wherein the acid salt catalyst is a salt of an alkarylsulfonic acid and a tertiary amine.

5. A process as claimed in claim 2 wherein the acid salt catalyst is a salt of an alkarylsulfonic acid and a tertiary amine.

6. A process as claimed in claim 3 wherein the acid salt catalyst is a salt of an alkarylsulfonic acid and a tertiary amine.

7. A process as claimed in claim 3 wherein the acid salt catalyst is a member selected from the group consisting of pyridinium dodecylbenzenesulfonate, pyridinium p-toluenesulfonate, pyridinium trifluoromethanesulfonate, quinolinium dodecylbenzenesulfonate, quinolinium trifluoromethanesulfonate, N,N-diethylanilinium dodecylbenzenesulfonate, N,N-diethylanilinium trifluoromethanesulfonate, tridodecylammonium trifluoromethanesulfonate, anilinium p-toluenesulfonate, trioctylphosphonium dodecylbenzenesulfonate, anilinium dodecylbenzenesulfonate and anilinium trifluoromethane sulfonate.

8. A process as claimed in claim 3 wherein the acid salt catalyst is pyridinium dodecylbenzenesulfonate.

9. A process as claimed in claim 1 wherein the reaction mixture is neutralized after (a) and (b) have reacted.

10. A process as claimed in claim 9 wherein the neutralization is effected by using an alkali metal bicarbonate.

References Cited

UNITED STATES PATENTS

| | | | |
|---|---|---|---|
| 2,834,748 | 5/1958 | Bailey et al. | 260—448.8 R X |
| 2,917,480 | 12/1959 | Bailey et al. | 260—448.8 R X |
| 3,170,894 | 2/1965 | Brown et al. | 260—46.5 R |
| 3,600,418 | 8/1971 | Bailey et al. | 260—448.8 R |

DANIEL E. WYMAN, Primary Examiner
P. F. SHAVER, Assistant Examiner

U.S. Cl. X.R.

260—2.5 AM, 2.5 AF

UNITED STATES PATENT OFFICE
CERTIFICATE OF CORRECTION

Patent No. 3,801,616  Dated April 2, 1974

Inventor(s) Carl J. Litteral   Page 1 of 2

It is certified that error appears in the above-identified patent and that said Letters Patent are hereby corrected as shown below:

Col. 1, line 26, "hyroxy" should be "hydroxy".

Col. 1, lines 33-34 after "copolymers" insert the following: ", it is desirable to produce block copolymers".

Col. 2, line 23 "bensyl" should be "benzyl".

Col. 2, line 59 "Ucon" should be "UCON".

Col. 5, line 39 "Amberlyst" should be "AMBERLYST".

Col. 8, line 30, (Table I, Last Column Heading), " (cst.) " should be "(cstks.)".

Col. 9, line 1, after "used", "in" should be "is".

Col. 10, line 5 (Table III, Last Column Heading), "(cst.)" should be "(cstks.)".

Col. 11, line 20 (Table V, Example 37 under Column Heading "Reaction time (hours)"), "2.35" should be "2.25".

Col. 11, line 35 (Table VI, Example 35 under Column Heading "Test IV Cells per inch"), "28" should be "38".

Col. 11, line 59, "dodeceylbenzenesulfonate" should be "dodecylbenzenesulfonate".

Col. 12, line 7, (Table VII, Column Heading) "Test II" should be "Test III"; "(cst.)" should also be "(cstks.)."

UNITED STATES PATENT OFFICE
CERTIFICATE OF CORRECTION

Patent No. 3,801,616      Dated April 2, 1974

Inventor(s) Carl J. Litteral      Page 2 of 2

It is certified that error appears in the above-identified patent and that said Letters Patent are hereby corrected as shown below:

Col. 12, line 40, "ivention" should be "invention".

Col. 13, line 57, the terminal portion of the formula which reads "$(Me_2SiO)_{16}(C_2H_5O_{4.5})_3$" should read "$(Me_2SiO)_{18}(C_2H_5O_{0.5})_3$".

Col. 14, line 4 (Table IX under Last Column Heading), "(cst.)" should be "(cstks.)".

Col. 14, line 66 (Table XI under Last Column Heading), "(cst)" should be "(cstks.)".

Col. 15, line 13 (Table XII, Example 66 under Column Heading "Test I Airflow"), "53.5" should be "5.35".

Col. 15, line 62 (Table XIII, Last Column Heading), "(cst.)" should be "(cstks.)".

Col. 17, line 4 (Table XV under Column Heading "Viscosity"), "cst." should be "cs.".

Signed and Sealed this twentieth Day of April 1976

[SEAL]

Attest:

RUTH C. MASON
*Attesting Officer*

C. MARSHALL DANN
*Commissioner of Patents and Trademarks*